United States Patent [19]
Santini

[11] 3,886,761
[45] June 3, 1975

[54] THERMOSTATICALLY OPERATED SUCTION THROTTLING VALVE

[75] Inventor: Mario P. Santini, Clarkston, Mich.

[73] Assignee: Chrysler Corporation, Highland Park, Mich.

[22] Filed: Mar. 3, 1971

[21] Appl. No.: 120,575

[52] U.S. Cl. ............................................. 62/217
[51] Int. Cl. ........................................... F25b 41/04
[58] Field of Search .............................. 62/212, 217

[56] References Cited
UNITED STATES PATENTS
| | | | |
|---|---|---|---|
| 3,640,086 | 2/1972 | Brody | 62/217 |
| 3,691,783 | 9/1972 | Proctor | 62/212 |
| 3,785,554 | 1/1974 | Proctor | 62/217 |

*Primary Examiner*—Meyer Perlin
*Attorney, Agent, or Firm*—Talburtt & Baldwin

[57] ABSTRACT

Automotive vehicle refrigerant system including a compressor, condenser, expansion valve, evaporator and a valve between the evaporator and the compressor for controlling the flow of refrigerant therethrough in response to the refrigerant temperature to inhibit freezing of condensate on the evaporator fins.

2 Claims, 5 Drawing Figures

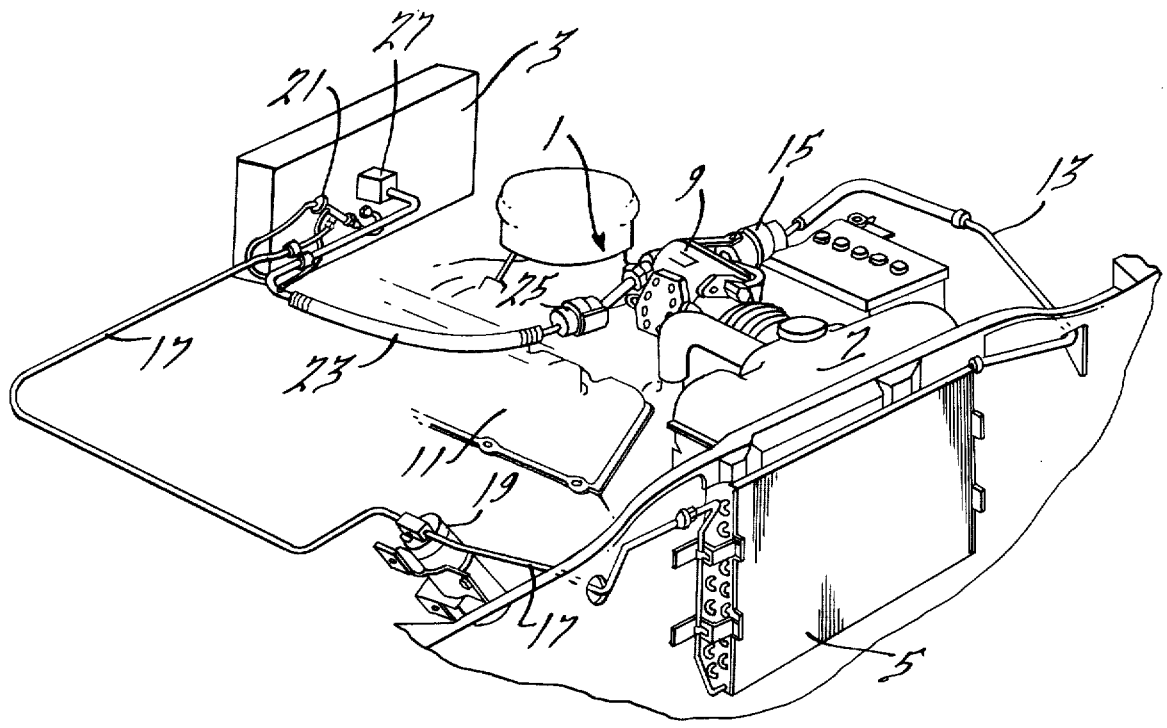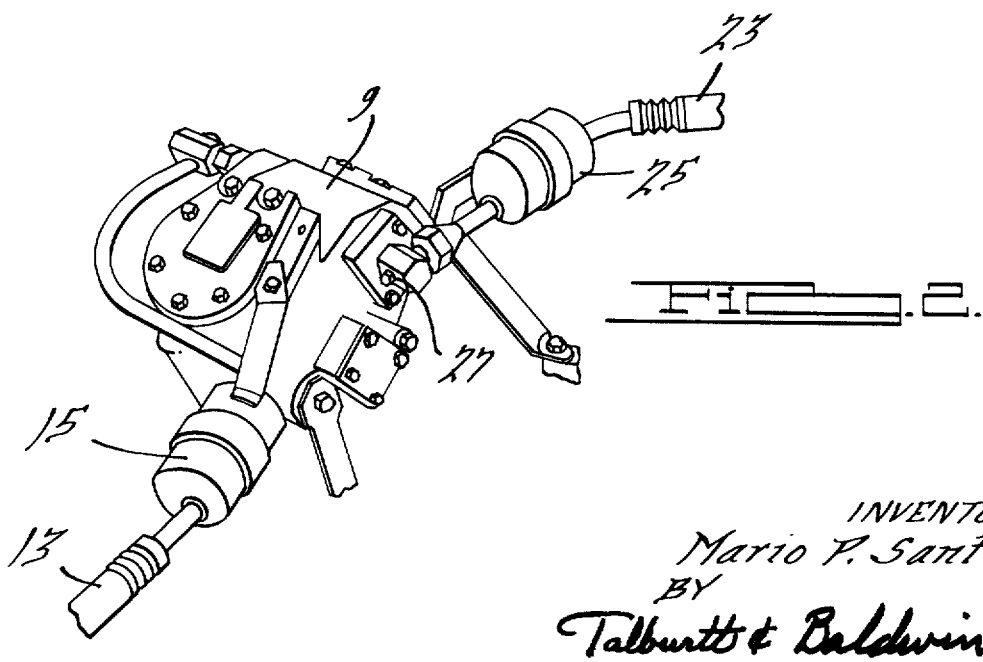

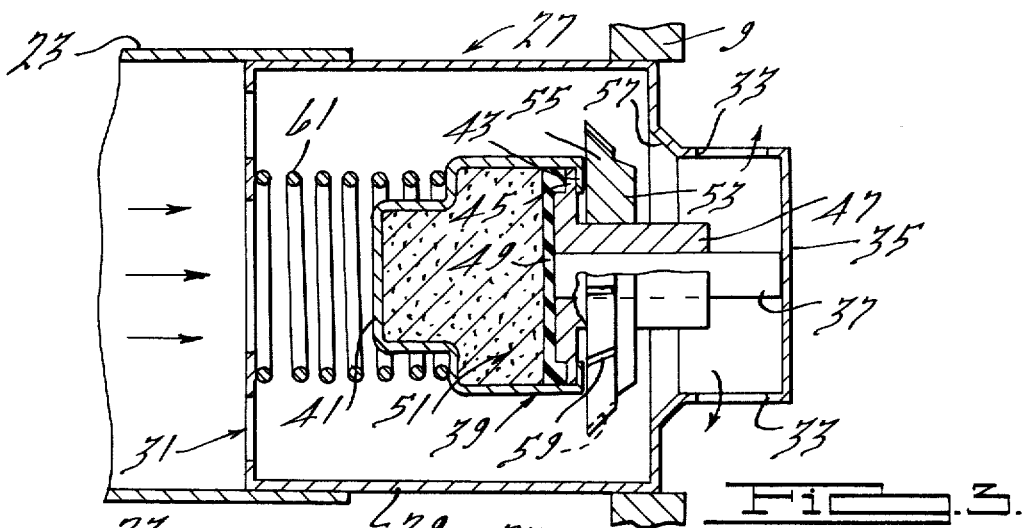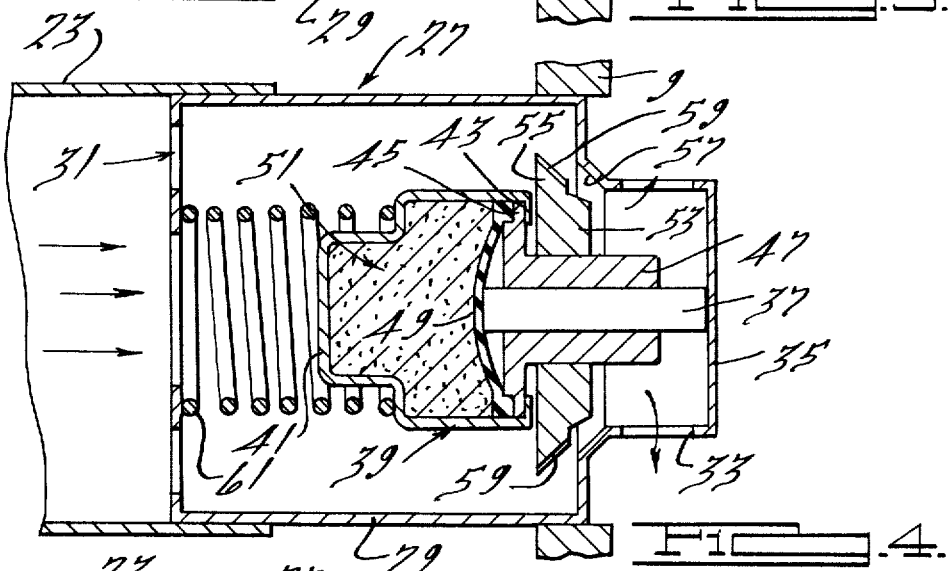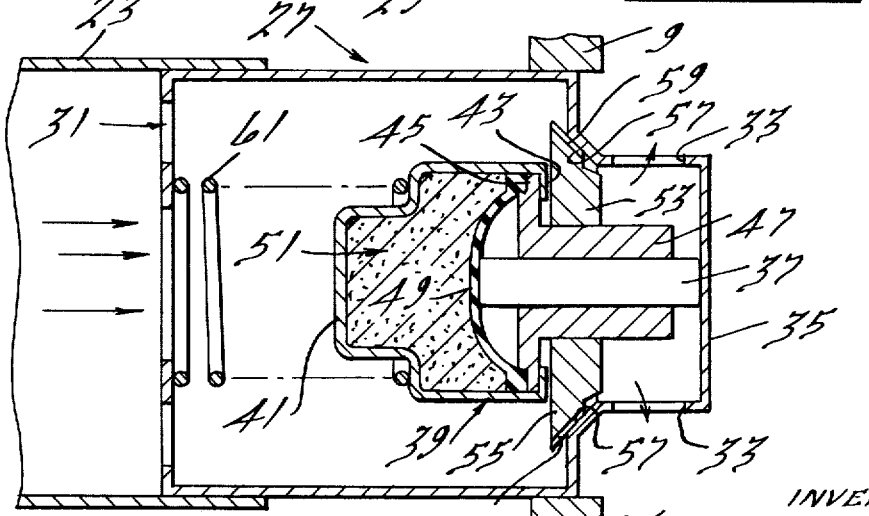

THERMOSTATICALLY OPERATED SUCTION THROTTLING VALVE

BACKGROUND OF THE INVENTION

This invention relates to air conditioning apparatus and more particularly, to an air conditioning apparatus for an automotive vehicle, the apparatus including means for preventing freezing of evaporator condensate.

In automotive air conditioning systems a significant problem is encountered if the temperature of refrigerant flowing through the evaporator drops below a predetermined point at which condensate on evaporator fins will freeze, i.e., when the temperature of the refrigerant in the evaporator drops to some point at or below 32° F. The ice can rapidly build up and block the flow of air through the evaporator. One method of preventing the refrigerant temperature from dropping to such temperature is to regulate the pressure of the refrigerant in the evaporator. This may be accomplished by using a pressure responsive valve member adapted to control the refrigerant pressure in the evaporator in response to the refrigerant pressure in the suction line leading to the compressor. It also may be accomplished by using a valve in the suction line which is responsive to the temperature of the evaporator fins. This invention is directed to a different method of preventing freeze-up of condensate on the evaporator fins.

BRIEF SUMMARY OF THE INVENTION

Briefly, this invention comprises a thermostatically operated suction valve responsive to the temperature of refrigerant emanating from the evaporator coil for preventing evaporator freeze-up.

One of the primary objects of this invention is to provide an automotive air conditioning assembly which includes a valve to prevent freezing of evaporator condensate.

Another object of this invention is to provide an assembly such as described in which the valve is adapted to operate in spite of the presence of foreign materials in the refrigerant system, i.e., the valve is dirt tolerant.

A further object of the invention is to provide an air conditioning system of the type described in which the return of lubricant to the compressor is insured even though a valve adjacent said compressor may be in its most fully closed position.

Still another object of the invention is to provide an air conditioning system of the class described having a valve which permits a relatively unrestricted refrigerant flow therethrough when in an open position.

Another object of this invention is to provide an air conditioning system such as described which has a suction throttling valve which does not resonate or produce an objectionable audible noise during its operation.

Another object of this invention is to provide an automotive air conditioning system having a suction throttling valve which, in the event of failure, moves to an open position thereby insuring the flow of refrigerant.

Still another object of this invention is to provide an automotive air conditioning system having a suction throttling valve which is economical in construction and efficient in operation.

Other objects and advantages of this invention will be made apparent as the description progresses.

BRIEF DESCRIPTION OF THE DRAWINGS

In the drawings, in which several of various possible embodiments of the invention are illustrated, FIG. 1 is a perspective view of an automotive air conditioning system constructed in accordance with this invention using a suction throttling valve of this invention;

FIG. 2 is a fragmentary perspective view of FIG. 1 taken in the direction of the arrow shown in FIG. 1 illustrating a modification;

FIG. 3 is an enlarged diagrammatic section of a suction throttling valve used in the apparatus shown in FIG. 1, showing the valve in one position; and FIGS. 4 and 5 are views similar to FIG. 3, showing the valve in other positions.

Like parts are indicated by corresponding reference characters throughout the several views of the drawings.

DESCRIPTION OF THE PREFERRED EMBODIMENT

Referring now to the drawings, an automotive air conditioning system of this invention is generally indicated at 1. It includes an evaporator 3 located inside the passenger compartment of the vehicle, a condenser 5 adjacent the vehicle radiator 7, and a compressor 9 adapted to be driven by the vehicle engine 11.

The compressor 9 is connected to the condenser 7 by a discharge hose 13 having a discharge muffler 15 therein. The condenser 7 is connected to the evaporator 3 by a liquid tube 17 having a receiver drier and sight glass unit 19 and a conventional expansion valve assembly 21 therein. The outlet from evaporator 3 is connected by a suction line or hose 23 to the suction side of the compressor 9. Line 23 includes a suction muffler 25 and a suction throttling valve 27 of this invention. The valve 27 is shown as being located adjacent the evaporator outlet. However, as shown in FIG. 2 it could be located in the inlet to the compressor 9. It will be understood, however, that the valve 27 could be located anywhere between the evaporator 3 and the compressor 9.

The suction throttling valve 27 shown in FIG. 2 includes a hollow body 29 having an inlet 31 at one end. Outlet ports 33 are provided adjacent the other end 35 of the valve. The end 35 provides a reaction member or base against which a rod or piston 37 of valve assembly 39 is biased.

Valve assembly 39 includes a cup-shaped member 41 having a lip 43 thereof directed inwardly to retain the laterally extending peripheral portion 45 of a tubular guide 47. A flexible diaphragm 49 extends across the cup adjacent the peripheral portion 45 of guide 47 and the end of rod 37.

The space between the bottom of cup 41 and diaphragm 49 is filled with a temperature responsive expansible material 51 adapted to expand and contract in response to temperature changes. More particularly, the material 51 is adpated to expand during a change in state from solid to liquid during temperature increases and contract during a change in state from liquid to solid during decreases in temperature.

A valve member 53 is threadedly connected to guide 47 so that its position thereon is adjustable. Valve 53 has a portion 55 shaped generally similar to the frustum of a cone, i.e., it is generally frusto-conical in shape.

Frusto-conical section 55 is adapted to mate with a seat 57 formed on body 29. Frusto-conical section 55 has a plurality of grooves 59 therein which permit leakage of lubricant and refrigerant when the valve is closed. If desired, the valve 53 can be made integral with the cup 41.

The valve assembly 39, including the valve member 53, is biased toward the seat 57 by a spring 61 reacting against the outer end of body 29.

Operation of the apparatus is as follows:

When the complete air conditioning system shown in FIG. 1 is operating and the temperature of the refrigerant vapor emanating from the evaporator through line 23 is above a predetermined temperature, such as 38° F., for example, at which temperature it is desired to begin throttling of the refrigerant vapor, the material 51 is in its most expansible condition and holds the rod 37 in the FIG. 3 position. In such position the valve 53 is held in its fully open position by the engagement of rod 37 with diaphragm 49 and refrigerant flows freely through the valve.

When the temperature of the refrigerant vapor in line 23 reaches the predetermined temperature and begins dropping below such temperature and approaches the temperature which will result in freezing of condensate on the evaporator fins, the material 51 then begins to contract or solidify. As the material contracts the rod 37 moves to the left as viewed in FIGS. 3 and 4 relative to the guide 47. The spring 61 maintains the rod in contact with the end 35 of body 29 and with the diaphragm 49. This causes the cup 41 and valve 53 to move toward seat 57. As the valve 53 is just about seated on seat 57, the refrigerant pressure on the upstream side thereof, being greater than the refrigerant pressure on the downstream side thereof, will aid the force of spring 61 in causing the frusto-conical section 55 to move rapidly onto the seat. The grooves or recesses 59 insure a minimum flow of refrigerant and lubricant so that proper lubrication of the compressor can be maintained.

The closing of valve 53 will cause the temperature of refrigerant within the evaporator to begin to rise, thus preventing freezing of condensate. When the temperature of the refrigerant in line 23 rises above the point at which freezing of condensate will occur, the material 51 begins to melt and expand, thus forcing diaphragm 49 to the right as viewed in FIG. 5. This forces the rod 37 to the right relative to guide 47 and the valve moves away from seat 59 against the bias of spring 61. The force generated by the expanding material 51 is greater than the combined spring and pressure differential pressure exerted on the valve assembly. As the valve unseats, any contaminants which may have gathered at the valve passages 55 are washed out by the refrigerant passing through the space between the valve 53 and seat 59. When the valve opens, refrigerant flows therethrough and the temperature of the refrigerant in the evaporator and line 23 will begin to drop.

If the load at the evaporator is light, the valve 53, when closed, will permit the refrigerant temperature within the evaporator to rise, which in turn, will cause the valve to open. The fluctuation of the valve is relatively slow and can be controlled by proper selection of the temperature responsive material 51 and by the shape of the valve 53.

It will be seen that the apparatus of this invention eliminates the necessity of using a relatively expensive evaporator pressure regulator. The present valve member accomplishes all of the requirements currently being met by the evaporator pressure regulators, but at considerably less cost.

In view of the foregoing, it will be seen that the several objects of this invention are achieved.

Although only one embodiment of the invention has been disclosed and described, it is apparent that other embodiments and modifications of the invention are possible.

I claim:

1. Air conditioning apparatus comprising a compressor having a suction and a discharge side, an evaporator, a condenser, a first line joining the discharge side of said compressor to an inlet in said condenser, a second line joining an outlet in said condenser to an inlet in said evaporator, and a third line joining an outlet from said evaporator to the suction side of said compressor, said line joining said evaporator to said compressor including means for throttling the flow of refrigerant from said evaporator to said compressor, said means including a housing having an inlet at one end and an outlet adjacent the other end, movable valve means in said housing adapted to move between an open position in which refrigerant flow therethrough is established and a substantially closed position in which refrigerant flow therethrough is substantially blocked, and temperature responsive means for controlling the movement of said movable valve means, said temperature responsive means being responsive to the temperature of refrigerant in leaving said evaporator, said valve means including a valve member portion and a valve seat portion, a retainer connected to said valve member portion, temperature responsive means in said retainer means adapted to contract in response to a decrease in the temperature of refrigerant therearound and to expand in response to an increase in the temperature of refrigerant therearound, a diaphragm extending across one end of said retainer, a rod one end of which engages said diaphragm and movable relative to said valve member portion, the other end of said rod being adjacent said other end of said housing and held against movement in one direction beyond a predetermined point by engagement thereof with said other end of said housing, and means biasing said retainer means and diaphragm in said one direction, said valve member portion being held in said open position by said rod when the temperature of refrigerant around said temperature responsive materials is above a predetermined temperature which results in freezing of condensate on said evaporator and said temperature responsive material is of a predetermined volume, said means biasing said retainer means in said one direction moving said valve member portion toward said valve seat portion and said substantially closed position when the temperature of said temperature responsive materials approaches said predetermined temperature and the volume of said temperature responsive materials is being reduced at least one passage in one of said portions for permitting the passage of refrigerant therethrough when said valve member portion is seated on said seat portion.

2. Air conditioning apparatus as set forth in claim 1 wherein said valve member portion is generally frusto-conical in shape.

* * * * *